US006944336B2

(12) United States Patent
Chiu

(10) Patent No.: US 6,944,336 B2
(45) Date of Patent: Sep. 13, 2005

(54) FAST GAMMA CORRECTION METHOD FOR IMAGE READING APPARATUS

(75) Inventor: Sean Chiu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 710 days.

(21) Appl. No.: 09/912,397

(22) Filed: Jul. 26, 2001

(65) Prior Publication Data

US 2003/0021473 A1 Jan. 30, 2003

(51) Int. Cl.$^{7}$ .................................................. G06K 9/00

(52) U.S. Cl. ....................... 382/167; 382/274; 345/606; 348/254; 348/674; 358/519

(58) Field of Search ................................ 382/162, 167, 382/274; 345/600, 606, 610; 348/254, 674; 358/461, 518, 519

(56) References Cited

U.S. PATENT DOCUMENTS 5,680,476 A * 10/1997 Schmidt et al. ............. 382/159
5,818,521 A * 10/1998 Hieda ...................... 348/222.1
6,130,763 A * 10/2000 Ohta et al. .................. 358/518

* cited by examiner

*Primary Examiner*—Bhavesh M. Mehta
*Assistant Examiner*—Yubin Hung
(74) *Attorney, Agent, or Firm*—Rabin & Berdo, P.C.

(57) ABSTRACT

A fast gamma correction method for an image reading apparatus is proposed. The original intervals for normalized output data are combined to merged intervals fewer in number and the original color correction function is replaced by a fitting function in the merged intervals. For an input normalized data, the corresponding merged interval is found and a fitting function associated with the merged interval is invoked to find the corresponding normalized and corrected data.

5 Claims, 3 Drawing Sheets

FAST GAMMA CORRECTION METHOD FOR IMAGE READING APPARATUS

FIELD OF THE INVENTION

The present invention relates to a fast gamma correction method for an image reading apparatus, especially to a fast gamma correction method for an image reading apparatus with less storage space.

BACKGROUND OF THE INVENTION

Image reading apparatuses such as scanners, digital still cameras and video cameras have become popular, as the Internet has become prevalent. The image reading apparatuses have different mechanisms and physical properties from image output apparatuses such as displays and printers. Therefore, the image data obtained from an image reading apparatus generally requires correction such as gamma correction to present a picture with fidelity.

Provided that X denotes input pixel data and Y denotes output pixel data, the Gamma correction can be expressed in the form Y=XY, or other empirical curve. The function representation is hard to realize by hardware, so a look-up table is often used to enhance processing speed. The size of the gamma correction table depends on the resolution (bit number) of the input pixel data and output pixel data. The gamma correction table requires 4K bytes of storage space for 12-bit input data and 8-bit output data. The gamma correction table requires 64K bytes of storage space for 16-bit input data and 8-bit output data, which is not feasible for an ordinary platform.

The applicability of the look-up table is also limited by data accessing speed. Page mode accessing is not useful due to the randomness of pixel data. The data accessing time is 120 ns for external 60 ns DRAM.

SUMMARY OF THE INVENTION

It is an object of the present invention to provide a gamma correction method for an image reading apparatus with less storage space.

It is an object of the present invention to provide a gamma correction method for an image reading apparatus with fast accessing speed.

To achieve the above objects, the gamma correction method for image reading apparatus according to the present invention comprises following steps:

a. provided that the normalized output pixel data Y is quantified by n-bit, the original 2" intervals is reduced to M merged interval, wherein M^2", the original correction function is represent by an approximated function with simple function form in each merged interval;

b. reading normalized input pixel data X and allocating the read data to a merged interval;

c. finding the normalized output pixel data Y by approximated function in the merged interval and the normalized input pixel data X.

The various objects and advantages of the present invention will be more readily understood from the following detailed description when read in conjunction with the appended drawing, in which:

DETAILED DESCRIPTION OF THE INVENTION

The gamma correction function is a generally monotonic function, and therefore, a realistic gamma correction function can be approximated by a simple function such as linear function segments or polynomial functions over specific intervals. The gamma correction function has good approximation by prudently choosing the intervals.

Figure 1:
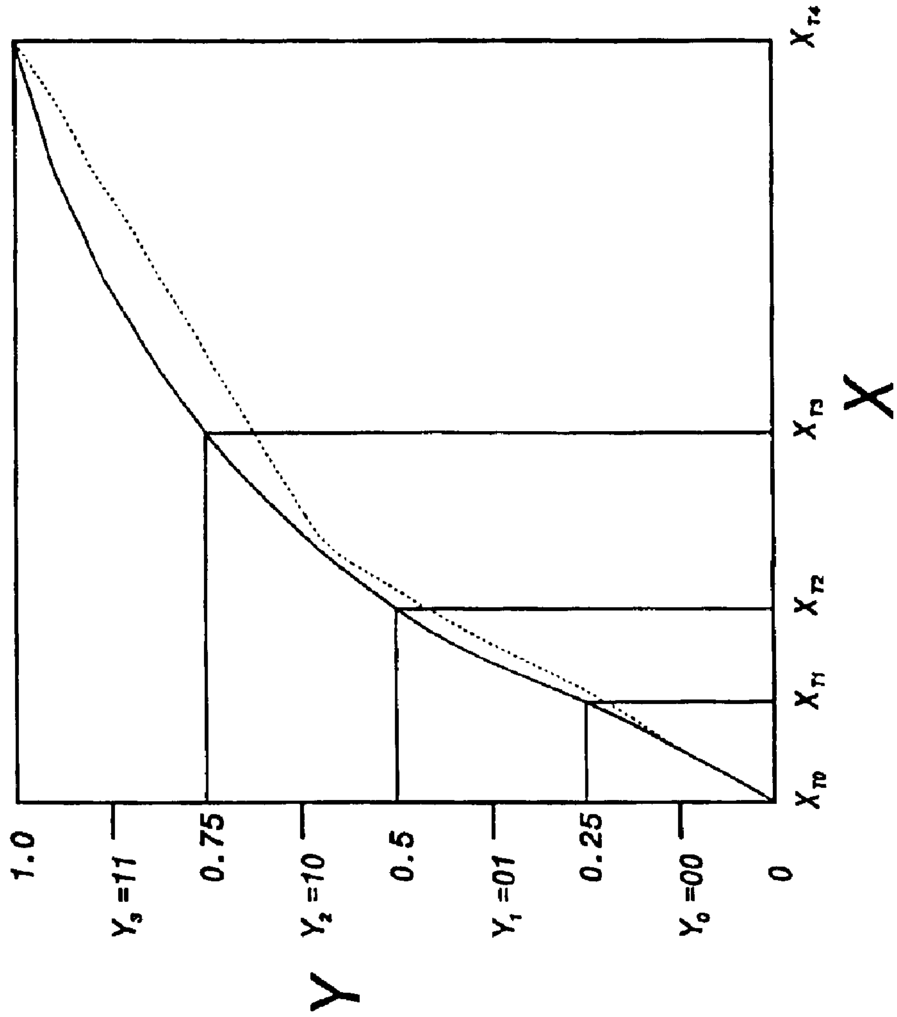
FIG. 1 is an example with liner fitting function segments for gamma correction function.

FIG. 1 shows a first example of a gamma correction function approximated by a linear function segments, wherein X denotes a normalized input signal to be corrected and Y denotes the normalized output signal after correction. The normalized output signal Y is quantified to 2 bits for illustration. The threshold values of the Y coordinate are 0, 0.25, 0.5, 0.75, and 1. That is, the output between 0 and 0.25 is $Y_0$ ( code 00 ), the output between 0.25 and 0.5 is $Y_1$ (code 01), etc. The solid line in this FIGURE represents a realistic gamma correction function and the dashed line segments in this FIGURE represent an approximated gamma correction function. The threshold values of the X coordinate $X_{T0}$, $X_{T1}$, $X_{T2}$, $X_{T3}$, $X_{T4}$ can be obtained by inversely mapping threshold values of the Y coordinate 0, 0.25, 0.5, 0.75, 1 with respect to the realistic gamma correction function.

In the example shown in FIG. 1, the related interval of the input pixel data X is determined with reference to the threshold values of X coordinate $X_{T0}$, $X_{T1}$, $X_{T2}$, X, $X_{T4}$ and then an appropriate fitting function is used to obtain corresponding output pixel data Y. In the example shown in FIG. 1, two comparison steps are required if binary search is used. If the output pixel data Y is represented by n bits, n comparisons are required, which is time consuming. In the present invention, the 2" intervals are merged to reduce search time.

The symbols used in the specification are list below for clarity:

m: resolution of input data n: resolution of output data $\{Y_0, Y_1 . . . Y_{2^n-1}\}$: symbolic set of output data $\{X_0, X_1 . . . X_{2^m-1}\}$: symbolic set of input data $\{T_0, T_1 . . . T_{2^n}\}$: output threshold set Y=G(X): realistic color correction function $F_{(h,k)}(.)$ fitting function in interval $(T_h, T_k)$ D(.): distortion measure function Q(.): quantizer function Provided $T_0=0$, $T_{2^n}=1$, which are boundary values of output pixel data and the thresholds $T_0, T_1 . . . T_{2^n}$ divide the range of normalized output data into 2 n intervals. The normalized output data can be obtained with reference to the thresholds $Y_j=(T_j+T_{j+1})/2$, j=0, 1, 2,.$2^n-1$ and the quantization of normalized output data is executed by following formula:

$$Q(Y)=Y_i,$$

where 1 satisfies the condition:

$$D(Y-Y_i)=\min\{D(Y-Y_j)|Y_J, j=0\sim 2^n-1\}$$

The input thresholds can also be obtained by the output thresholds:

$\{G^{-1}(T_0), G^{-1}(T_1) \ldots G^{-1}(T_2{}^n)\}$

If the $2^n$ intervals are not merged, the related interval of the input data is found and then the output signal is obtained by the function relationship Y=G(X). For example, for the input data $G^1(T_j)<X<G-1(T_{j+1})$, the output signal corresponding to X is $Y_j$.

The present invention is characterized in that the $2^n$ intervals of the output data are merged into a plurality of merged intervals, and the color correction function in each merged interval can be approximated by a suitable fitting function. For example, if the intervals between $T_h$ to $T_k$ are combined to a merged interval and the color correction function in the merged interval is approximated by a fitting function $F_{(h:k)}(.)$, which is a simple function such as a linear function or exponential function.

Figure 2:
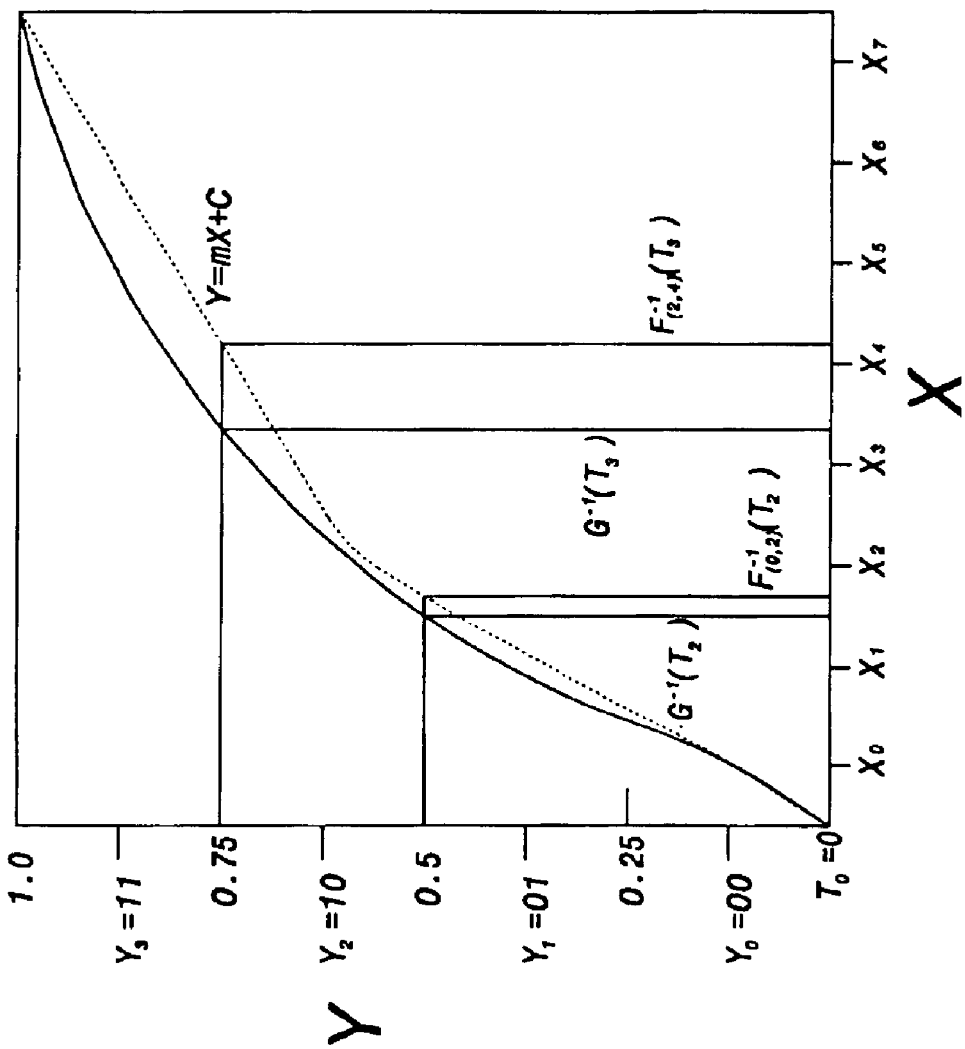
FIG. 2 demonstrates interval mergence in the present invention.

FIG. 2 demonstrates interval mergence in the present invention, wherein the fitting function $F(_{h,k})$ is an approximately linear function represented by a dashed line and the realistic color correction function is represented by solid line. In this example, m=3 and n=2, and there are four intervals for the output data. When one tries to combine interval $(T_2, T_3)$ and $(T_3,T_4)$, and approximates the color correction function in the merged interval by a fitting function $F_{(2;4)}(.)$, the quantized input data X4 has a contradiction because $Q(F_{(2,4)}\ (X4))=Y_2$ and $Q(G\ (X_4))=Y_3$. Therefore, the intervals $(T_2, T_3)$ and $(T_3,T_4)$ cannot be combined. On the contrary, the combination of intervals $(T_0, T_1)$ and $(T_1,T_2)$ is safe. Therefore, the intervals $(T_0, T_1)$ and $(T_1,T_2)$ can be combined into a merged $(T_0, T_2)$, and the color correction function in the merged interval is approximated by a fitting function $F_{(0,2)}(.)$.

Hereinafter is the merging algorithm for intervals step 0: set k=0;

step 1: set h=k;

step 2: set k=k+1;

step 3: if $k=2^n$, stop;

step 4: if s is within (h,k), and all $X_T$, $T=0..2^m-1$, in $(G^{-1}(T_s), G^{-1}(T_{s+1}))$, are equal to all $X_T$, $T=0 \ldots 2^m-1$ in $(F^{-1}{}_{(h,k)}(T_s), F^{-1}{}_{(h,k)}(T_{s+1}))$, back to step 2;

step 5: merging $(T_h, T_{h+1})\sim(T_{k-i}, T_k)$ into $(T_h, T_k)$, and recoding $F_{(h,k)}(.)$;

step 6: back to step 1.

As can be seen from above algorithm, the criterion to validate the merged interval is to check the consistency between the input data obtained by inverse mapping all output data in the merged interval by the realistic color correction function and the input data obtained by inverse mapping all output data in the merged interval by the fitting function. If the validation is positive, the mergence is allowable and the next interval to the merged interval is tested for further mergence.

Figure 3:
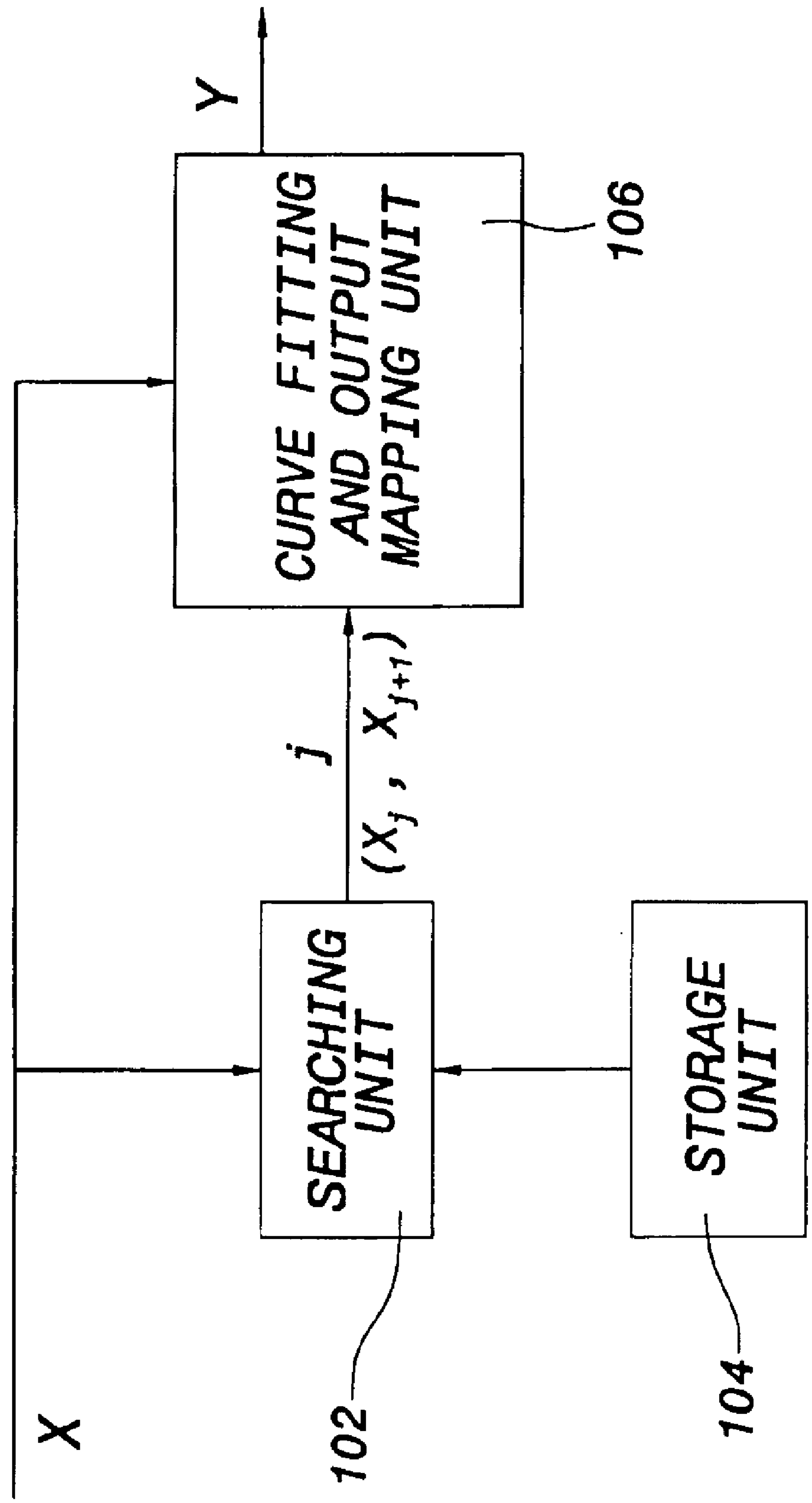
FIG. 3 shows a block diagram to realize the gamma correction method according to the present invention.

FIG. 3 shows a block diagram to realize the gamma correction method according to the present invention, wherein X denotes the normalized data to be corrected and Y denotes the normalized data after correction. The block diagram comprises a searching unit 102, a storage unit 104 and a curve fitting and output mapping unit 106. The searching unit 102 is used to find the related interval for the normalized input data X. The storage unit 104 is used to store the merged interval $(X_j, X_{j+1})$, j=0. . . M−1. The curve fitting and output mapping unit 106 is used to generate a fitting function corresponding to a related interval and then maps the input data to a corresponding corrected output data. For an input normalized data X to be corrected, the searching unit 102 compares the input normalized data X with thresholds in the storage unit 104 and finds a related interval for the input normalized data X. The curve fitting and output mapping unit 106 generates a fitting function corresponding to the related interval and then maps the input data to a corresponding corrected output data. Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A fast gamma correction method for an image reading apparatus with a color correction function and a plurality of normalized output pixel data after correction Y quantified by n-bits into $2^n$ intervals, comprising the following steps:

a. combining the $2^n$ intervals to M merged intervals, comprising the following steps:
  - a0: set k=0;
  - a1: set h=k;
  - a2: set k=k+1;
  - a3: if $k=2^n$, stop;
  - a4: if s is within (h,k), and all $X_T$, $T=0 \ldots 2^m-1$, in $(G^{-1}(T_s), G^{-1}(T_{s+1}))$, are equal to all $X_T$, $T=0..2^m-1$ in $(F^{-1}{}_{(h,k)}(T_s), F^{-1}{}_{(h,k)}(T_{s+1}))$, back to step a2;
  - a5: merging $(T_h, T_{h+1})\sim(T_{k-1}, T_k)$ into $(T_h, T_k)$, and recoding $F_{(h,k)}(.)$: and
  - a6: back to step a1;

wherein
  - m: resolution of normalized input data,
  - n: resolution of normalized output data,
  - Y=G(X): realistic color correction function,
  - $F_{(h,k)}(.)$ fitting function in interval $(T_h, T_k)$, and
  - $M \leqq 2^n$;

b. reading a normalized input pixel data X and locating which merged interval the input pixel data X lies in, wherein threshold values of the X coordinate can be obtained by inversely mapping threshold values of the Y coordinate; and c. finding the normalized output pixel data after correction Y by a fitting function in the merged interval and using the normalized input pixel data X for substitution.

2. The fast gamma correction method for an image reading apparatus as in claim 1, wherein in step a, the fitting function is a non-transcendental function.

3. The fast gamma correction method for an image reading apparatus as in claim 1, wherein image reading apparatus is selected from the group consisting of a scanner, a digital still camera, and a video camera.

4. The fast gamma correction method for an image reading apparatus as in claim 2, wherein the non-transcendental function is a polynomial function.

5. The fast gamma correction method for an image reading apparatus as in claim 2, wherein the non-transcendental function is an exponential function.

* * * * *